(No Model.) 2 Sheets—Sheet 1.

B. F. JACKSON & M. L. HUGHES.
WAGON BRAKE.

No. 548,992. Patented Oct. 29, 1895.

WITNESSES:
INVENTORS
BY
ATTORNEYS.

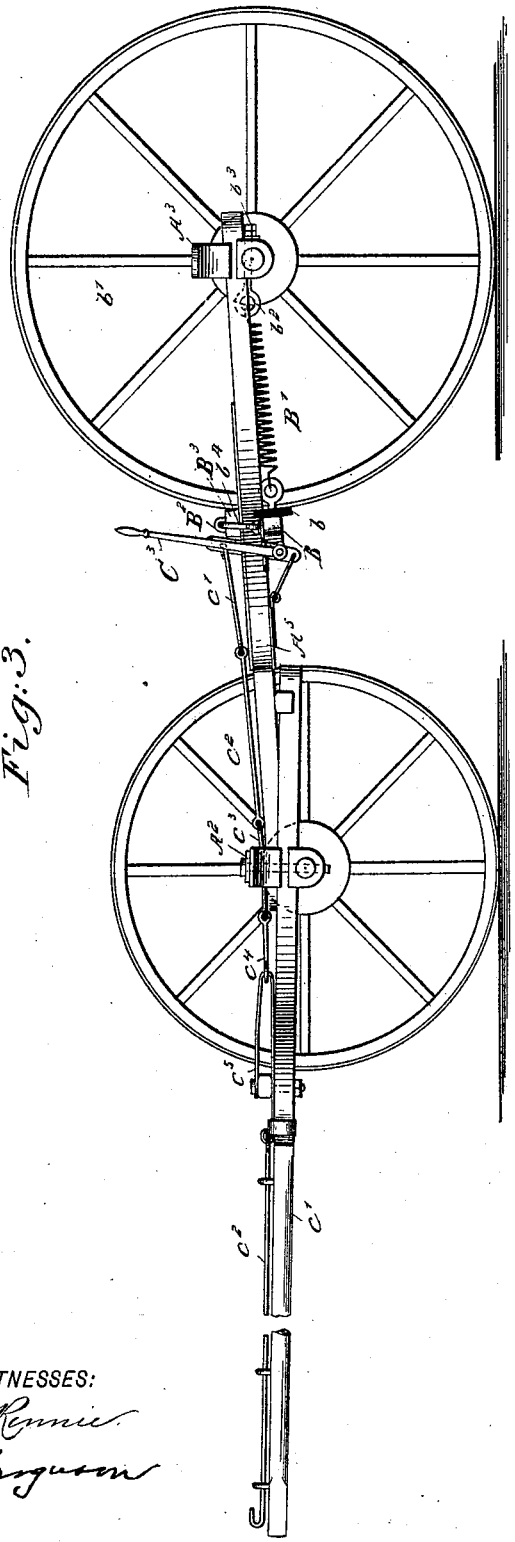

UNITED STATES PATENT OFFICE.

BENJAMIN FRANKLIN JACKSON AND MARSHAL L. HUGHES, OF SUTTON, WEST VIRGINIA.

WAGON-BRAKE.

SPECIFICATION forming part of Letters Patent No. 548,992, dated October 29, 1895.

Application filed June 1, 1895. Serial No. 551,389. (No model.)

*To all whom it may concern:*

Be it known that we, BENJAMIN FRANKLIN JACKSON, and MARSHAL L. HUGHES, of Sutton, in the county of Braxton and State of West Virginia, have invented certain new and useful Improvements in Wagon-Brakes, of which the following is a full, clear, and exact description.

This invention relates to brakes for road-vehicles, and is particularly applicable to wagons used for transporting heavy loads and drawn by two or more horses. The object of the invention is to provide an automatically-acting brake that is positive in its action, and simple, yet strong and durable, in its construction.

The invention consists in mechanism for automatically setting the brake when a vehicle is traveling a downgrade or when the pulling strain of the horses is relieved. It further consists in the construction and novel arrangement of parts, as will hereinafter appear, and be particularly pointed out in the appended claims.

Reference is to be had to the accompanying drawings, forming a part of this specification, in which similar characters of reference indicate corresponding parts, in all the figures.

Figure 1:
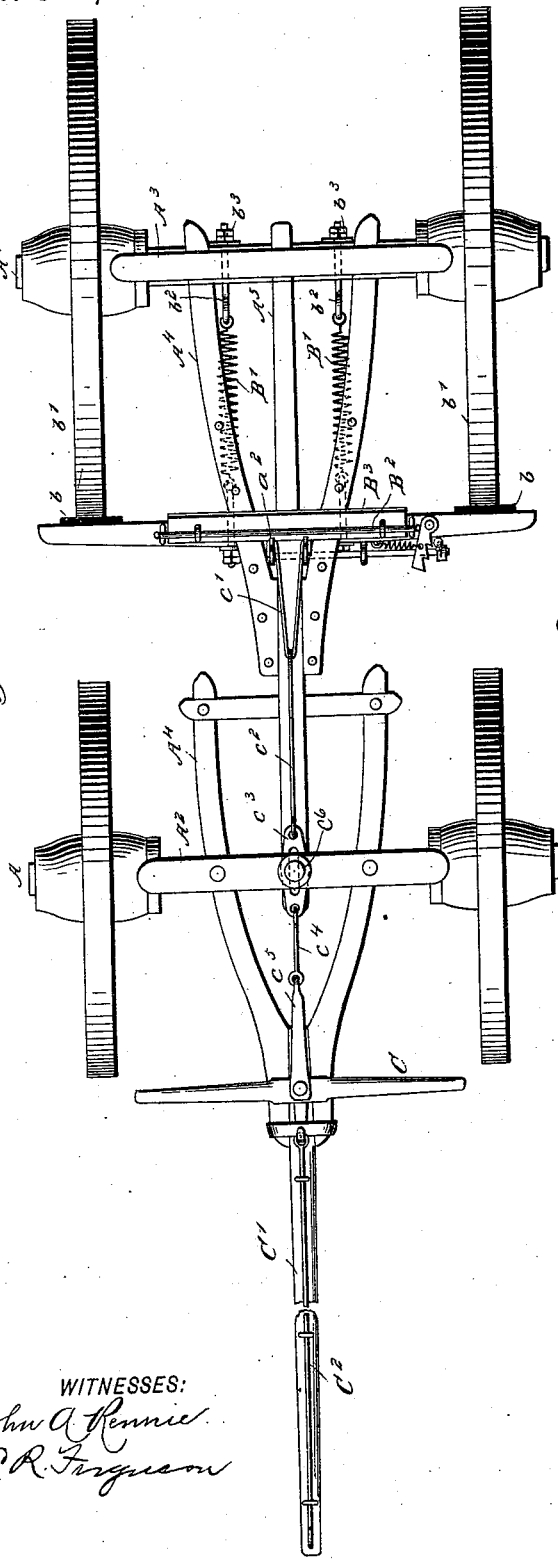
Figure 2:
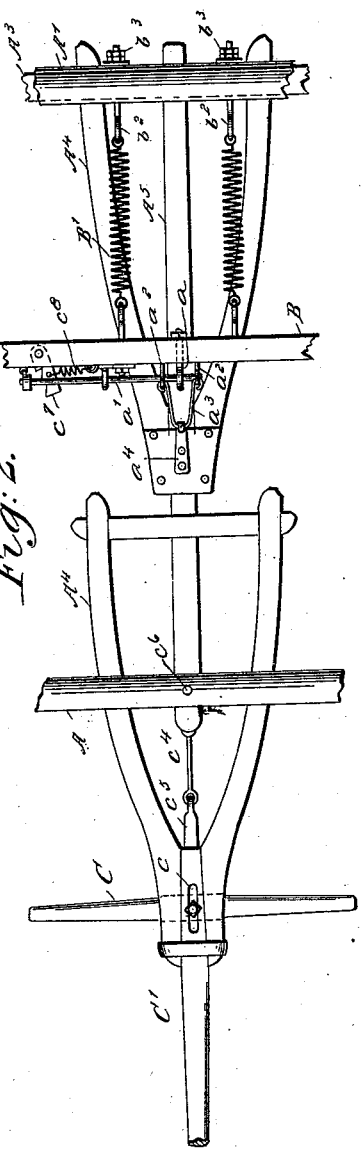

Figure 1 is a top plan view of a wagon and brake embodying the invention. Fig. 2 is a bottom plan view thereof, and Fig. 3 is a side elevation.

In the drawings, A designates the front axle, A' the rear axle, $A^2 A^3$ the bolsters on the respective axles, $A^4$ the hounds, and $A^5$ the reach, all substantially of the usual construction.

B shows the brake-beam arranged transversely beneath the rear hounds $A^4$ and provided at its ends with brake-shoes $b$, adapted to engage with the rear wheels $b'$. From the rear side of the brake-beam coiled springs B' extend to a connection with the rear axle A', these springs being sufficiently strong to hold the brake-shoes against the wheels with sufficient pressure to brake the wagon, and as a means for regulating their tension eyebolts $b^2$ are extended from the springs through openings in the axle, and their outer-threaded ends are provided with nuts $b^3$.

From the front of the brake-beam an eye $a$ extends to a pivotal connection with a rod $a'$, which has rigidly attached to it draw-levers $a^2$, which respectively extend upward at the sides of the reach. The lower ends of the levers $a^2$, which project below the pivotal point $a$ of the brake-beam, are pivotally connected to a loop $a^3$, which has a swinging attachment to a hook or plate $a^4$, secured to the lower front portion of the rear hounds $A^4$. The brake-beam B has pivotal connection with the downwardly-extended ends $b^4$ of a rock-shaft $B^2$, mounted to rock on a bar $B^3$, extended across and secured to the upper side of the rear hounds $A^4$. There is a connection between the upper ends of the levers $a^2$ and the doubletree C, the bolt of which extends through a longitudinal slot $c$ in the tongue C' of the vehicle, so that the doubletree may have a movement longitudinally of the tongue.

The connection between the levers and doubletree, as here shown, consists of a loop $c'$, having its arms in pivotal connection with the respective levers, a rod $c^2$, extended from the loop $c'$ to a plate $c^3$, a link $c^4$, connecting the plate $c^3$ to a plate $c^5$, attached to the doubletree. The plate $c^3$ is longitudinally slotted and the king-bolt $c^6$ passes through said slot, so that the plate is held in proper position, but may be easily moved longitudinally between the front bolster and the reach, which is engaged by the king-bolt.

When four animals are employed to draw the vehicle, the doubletree to which the lead horses are attached is engaged with the forward hook end of a rod $C^2$, extended through guides on the tongue C' and connected to the plate $c^5$ or an extension therefrom, as shown in the drawings.

The operation of the brake as so far described is as follows: When the brake-shoes are in contact with the wheels, the upper ends of the levers $a^2$ will incline rearward, and the pivotal connection of the brake-beam with the levers will be rearward of the fulcrum-point of the levers. It is obvious, therefore, that when forward strain is exerted on the doubletree to draw the vehicle along the levers $a^2$ will be rocked to draw the brake-shoes away from the wheels against the resistance of the springs B'. On a downgrade, or when the draft on the levers is released, the springs B' will operate to draw the brake-shoes tightly against the wheels and brake the vehicle. When it is desired to back the vehicle or to move one or both of the rear wheels, it is necessary to lock the brake out of engagement with the wheels. For this purpose the rod $a'$ is extended sufficiently outward to clear the body of the vehicle and the outer end is provided with a hand-lever $C^3$. A notched locking-latch $c^7$, pivotally connected to the brake-beam, is adapted to be swung into engagement with the rear side of the lever $C^3$ after the same shall have been rocked to relieve the wheels of the brake-shoes. When the vehicle is drawn forward, as heretofore explained, a spring $c^8$, attached at one end to the latch and at the other end to the brake-beam, will automatically draw the latch out of engagement with the lever, thus again putting the brake in condition for its automatic action.

Having thus described our invention, we claim as new and desire to secure by Letters Patent—

1. A wagon brake comprising a brake beam having shoes to engage the wheels, a spring connected to said beam and arranged to throw the same into braking position, a pivoted lever connected to said brake beam and also connected to a draft mechanism whereby the brake beam is normally held out of braking position while the vehicle is in motion, a latch device adapted to engage and hold the lever against movement when the break beam is out of braking position, and means to release said lever and permit the brake beam to assume its operative position, when a pull is exerted on the draft mechanism as set forth.

2. A wagon brake comprising a brake beam having shoes to engage the wheels, a spring connected to said beam and arranged to throw the same into braking position, a pivoted lever connected to said brake beam, a draft mechanism connected to said lever and adapted to hold the brake beam normally out of braking position while the vehicle is in motion, a pivoted latch having notches to engage said lever and adapted to hold the same against movement when the brake beam is moved out of braking position and a spring to disengage said latch from the lever and permit the brake beam to assume its operative position, where a pull is exerted on the draft mechanism as set forth.

3. A wagon brake, comprising a brake beam having shoes to engage the wheels, a spring connected to the beam and arranged to throw the same into braking position, a lever having a swinging fulcrum and connected to said brake beam, and a draft mechanism connected to said lever and arranged to hold the brake shoes out of engagement with the wheels when a pull is exerted on said draft mechanism.

BENJAMIN FRANKLIN JACKSON.
MARSHAL L. HUGHES.

Witnesses:
S. H. KELLY,
FRED L. FOX.